US010935459B2

(12) United States Patent
Sinharay et al.

(10) Patent No.: US 10,935,459 B2
(45) Date of Patent: Mar. 2, 2021

(54) UNOBTRUSIVE AND AUTOMATED DETECTION OF FREQUENCIES OF SPATIALLY LOCATED DISTINCT PARTS OF A MACHINE

(71) Applicant: Tata Consultancy Services Limited, Mumbai (IN)

(72) Inventors: Arijit Sinharay, Kolkata (IN); Raj Rakshit, Kolkata (IN); Dibyendu Roy, Kolkata (IN); Tapas Chakravarty, Kolkata (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 278 days.

(21) Appl. No.: 16/248,646

(22) Filed: Jan. 15, 2019

(65) Prior Publication Data

US 2019/0323882 A1 Oct. 24, 2019

(30) Foreign Application Priority Data

Apr. 24, 2018 (IN) .............................. 201821015512

(51) Int. Cl.
*G01M 13/028* (2019.01)
*G01S 17/50* (2006.01)
(Continued)

(52) U.S. Cl.
CPC ............ *G01M 13/028* (2013.01); *G01H 9/00* (2013.01); *G01N 29/46* (2013.01); *G01S 13/50* (2013.01);
(Continued)

(58) Field of Classification Search
CPC .... G01M 13/028; G01S 13/52; G01S 13/867; G01S 15/52; G01S 17/50
See application file for complete search history.

(56) References Cited

U.S. PATENT DOCUMENTS

| 5,010,412 A * | 4/1991 | Garriss | ................ H04N 5/2256 348/371 |
| 2014/0324389 A1 * | 10/2014 | Baldwin | ................ G01D 21/00 702/187 |

FOREIGN PATENT DOCUMENTS

| EP | 0895095 A1 | 8/1996 |
| EP | 1859727 A1 | 5/2006 |

OTHER PUBLICATIONS

Raffo et al.; "Software Defined Doppler Radar as a Contactless Multipurpose Microwave Sensor for Vibrations Monitoring", Molecular Diversity Preservation International, MDPI, available at https://www.researchgate.net/publication/312147740 Software Defined Doppler Radar as a Contactless Multipurpose Microwave Sensor for Vibrations Monitoring, vol. 17, No. 1, pp. 1-15, (2017).

* cited by examiner

*Primary Examiner* — Paul M. West
(74) *Attorney, Agent, or Firm* — Finnegan, Henderson, Farabow, Garrett & Dunner, LLP

(57) ABSTRACT

This disclosure relates generally to methods and systems for unobtrusive and automated detection of frequencies of spatially located distinct parts of a machine. Location of vibration and detection of vibration frequency of each vibrating part in a machine is critical for routine monitoring and fault detection in the machine. Current solutions use either high frames per second (fps) industrial grade camera or stroboscopes tuned at one particular frequency. Manual stroboscopes require manual intervention for objects moving at different speeds with high convergence time. Point-lasers need prior knowledge of exact location of faults. Also Point-by-point scanning of a large machine body is time consuming. In the present disclosure, a movement detector such as RADAR enables detecting all vibration frequencies that also serve to reduce the search space of a stroboscope
(Continued)

configured to start strobing at each detected vibration frequency to enable mapping of each vibration frequency to a corresponding vibrating part.

8 Claims, 7 Drawing Sheets

(51) Int. Cl.
    *G01S 13/86*     (2006.01)
    *G01S 13/52*     (2006.01)
    *G01S 15/52*     (2006.01)
    *G01H 9/00*     (2006.01)
    *G01N 29/46*     (2006.01)
    *G01S 13/50*     (2006.01)
    *G01S 15/50*     (2006.01)

(52) U.S. Cl.
    CPC ............ *G01S 13/52* (2013.01); *G01S 13/867* (2013.01); *G01S 15/50* (2013.01); *G01S 15/52* (2013.01); *G01S 17/50* (2013.01)

UNOBTRUSIVE AND AUTOMATED DETECTION OF FREQUENCIES OF SPATIALLY LOCATED DISTINCT PARTS OF A MACHINE

PRIORITY CLAIM

This U.S. patent application claims priority under 35 U.S.C. § 119 to: Indian Patent Application No. 201821015512, filed on 24 Apr. 2018. The entire contents of the aforementioned application are incorporated herein by reference.

TECHNICAL FIELD

The disclosure herein generally relates to vibration detection, and, more particularly, to unobtrusive and automated detection of frequencies of spatially located distinct parts of a machine.

BACKGROUND

A typical workstation has a collection of different vibrating or moving parts or has a large machine body with spatially distributed vibrating zones or parts. To detect the exact location and frequency of this vibration is crucial for both routine monitoring and fault detection. Current solutions use either high frames per second (fps) industrial grade camera or stroboscopes tuned at one particular frequency. Manual stroboscopes are also in use, which require manual intervention for objects moving at different speeds with high convergence time. Point-lasers are also in use, for which prior knowledge of exact location of faults are to be known. Also Point-by-point scanning of a large machine body takes up a lot of time.

SUMMARY

Embodiments of the present disclosure present technological improvements as solutions to one or more of the above-mentioned technical problems recognized by the inventors in conventional systems.

In an aspect, there is provided a processor implemented method comprising: detecting, by a movement detector, a set of vibration frequencies, each vibration frequency in the set of vibration frequencies corresponding to a vibrating part from a plurality of vibrating parts in a machine under inspection in a field of view (FOV) of the movement detector, each of the plurality of vibrating parts having a pre-defined marker for tracking the vibrating part associated thereof; and initiating, by a stroboscope, strobing at each vibration frequency from the set of vibration frequencies, starting at a first detected vibration frequency, the step of strobing at each vibration frequency comprising: recording an output of the stroboscope in the form of a video having a pre-determined length; and extracting from the video, at least one frame having a vibrating part corresponding to an associated vibration frequency, and mapping each vibration frequency detected by the movement detector to a corresponding vibrating part using the pre-defined marker.

In another aspect, there is provided a machine inspection apparatus comprising: a movement detector being an electromagnetic wave based contactless vibration detector selected from the group consisting of RAdio Detection And Ranging (RADAR), SOund Navigation And Ranging (SONAR) and Light Detection And Ranging (LIDAR) positioned such that a machine under inspection lies in a field of view (FOV) thereof, the movement detector configured to detect a set of vibration frequencies, each vibration frequency in the set of vibration frequencies corresponding to a vibrating part from a plurality of vibrating parts in the machine under inspection, each of the plurality of vibrating parts having a pre-defined marker for tracking the vibrating part associated thereof; a stroboscope located proximate the movement detector and configured to initiate strobing at each vibration frequency from the set of vibration frequencies, starting at a first detected vibration frequency; a video capturing device configured to record an output of the stroboscope in the form of a video having a pre-determined length; a controller unit in communication with each of the movement detector, the stroboscope and the video capturing device, wherein the controller unit comprises: one or more data storage devices configured to store instructions; and one or more hardware processors operatively coupled to the one or more data storage devices, wherein the one or more hardware processors are configured by the instructions to extract from the video, at least one frame having a vibrating part corresponding to an associated vibration frequency, and map each vibration frequency detected by the movement detector to a corresponding vibrating part using the pre-defined marker.

In yet another aspect, there is provided a system comprising: one or more data storage devices operatively coupled to the one or more processors and configured to store instructions configured for execution by the one or more processors to: receive a set of vibration frequencies, from a movement detector, each vibration frequency in the set of vibration frequencies corresponding to a vibrating part from a plurality of vibrating parts in a machine under inspection in a field of view (FOV) of the movement detector, each of the plurality of vibrating parts having a pre-defined marker for tracking the vibrating part associated thereof; trigger a stroboscope to initiate strobing at each vibration frequency from the set of vibration frequencies, starting at a first detected vibration frequency, wherein the step of strobing at each vibration frequency comprises: receiving an output of the stroboscope in the form of a video having a pre-determined length; and extracting from the video, at least one frame having a vibrating part corresponding to an associated vibration frequency, and mapping each vibration frequency detected by the movement detector to a corresponding vibrating part using the pre-defined marker.

In an embodiment of the present disclosure, the pre-determined length of the video is based on a trade-off between resolution of the detected vibration frequency and measurement time wherein longer the measurement time better is the resolution of the detected vibration frequency. In an embodiment, the pre-determined length of the video is 1 second.

In an embodiment of the present disclosure, the one or more hardware processors are further configured to extract from the video, a frame having a vibrating part by: obtaining a frequency spectrum of displacement of the pre-defined marker between frames comprised in the video using Fast Fourier Transform (FFT); determining a peak frequency from the obtained frequency spectrum; extracting and segmenting the at least one frame if the determined peak frequency is less than a pre-defined threshold based on a pre-defined precision; else incrementally tuning the stroboscope to strobe at frequencies that are multiples of 0.1 Hz times a pre-determined tuning parameter until the determined peak frequency is less than the pre-defined threshold and performing the step of extracting and segmenting; and mapping the vibration frequency at which the stroboscope is strobing to a vibrating part associated with the pre-defined marker identified in the segmented at least one frame.

In an embodiment of the present disclosure, the predetermined tuning parameter and the pre-defined threshold are based on a trade-of between resolution of the detected vibration frequency and measurement time.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
FIG. 1 illustrates an exemplary block diagram of a system for unobtrusive and automated detection of frequencies of spatially located distinct parts of a machine, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The current state of the art for routine inspection or fault detection of machines involves expensive high frames per second (fps) grade camera or stroboscopes tuned at one particular frequency. The solutions are also not fully automated and need high execution time. In accordance with the present disclosure, a RAdio Detection And Ranging (RADAR) guided stroboscope along with an ordinary 30 fps optical camera provides an automated and cost-effective solution to the industrial problem of performing routine inspection or fault detection in machines having distinct vibrating parts or. In the context of the present disclosure, the expressions 'parts' or 'vibrating parts' refer to vibrating or moving parts of a machine or spatially distributed vibrating locations or zones in a machine body. Also, the expression 'vibration' in the context of the present disclosure includes rotational and linear vibration.

Referring now to the drawings, and more particularly to FIGS. 1 through 6, where similar reference characters denote corresponding features consistently throughout the figures, there are shown preferred embodiments and these embodiments are described in the context of the following exemplary system and method.

FIG. 1 illustrates an exemplary block diagram of a system 100 for unobtrusive and automated detection of frequencies of spatially located distinct parts of a machine in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2A:
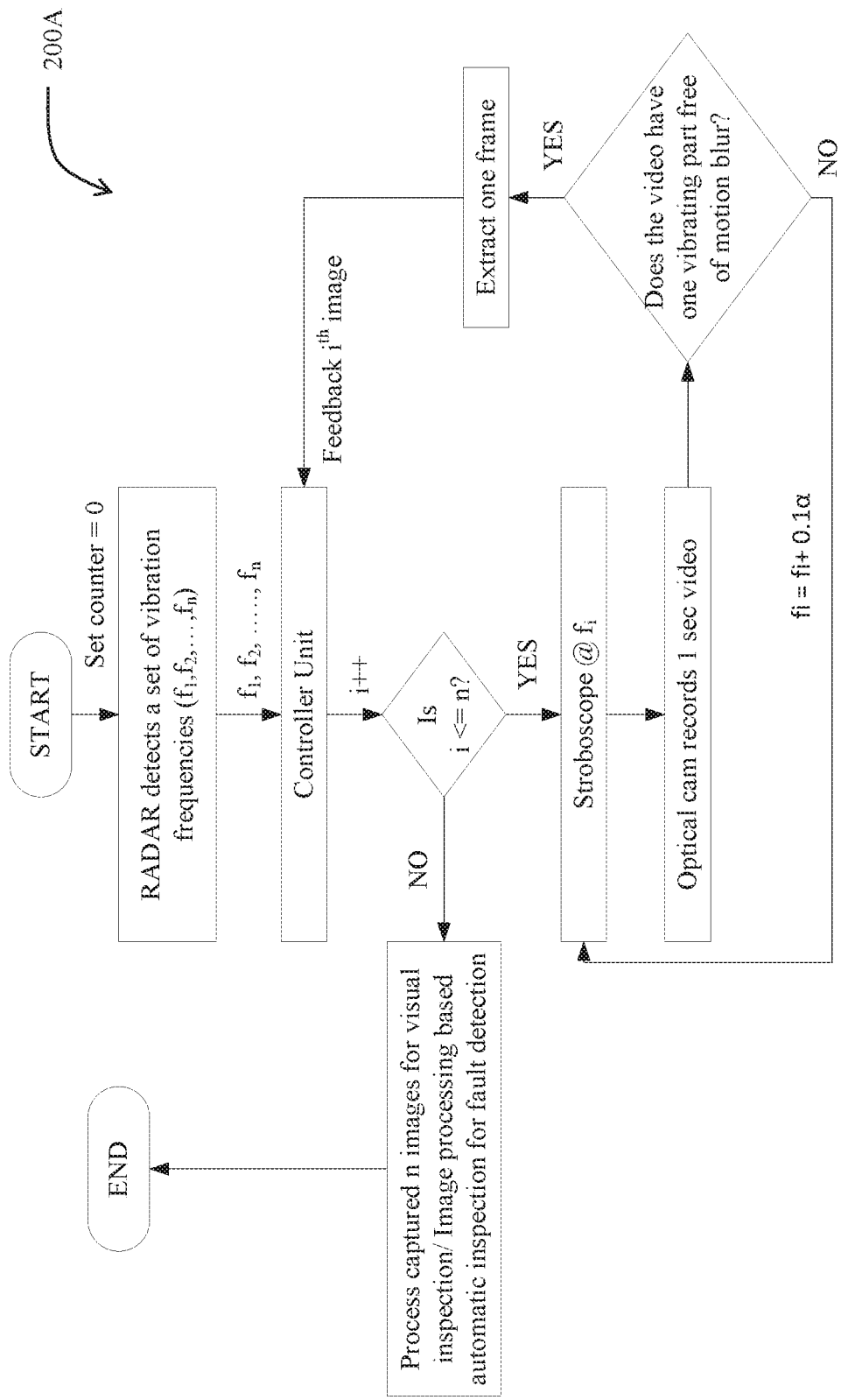
FIG. 2A illustrates an exemplary flow chart for a method for unobtrusive and automated detection of frequencies of spatially located distinct parts of a machine, in accordance with an embodiment of the present disclosure.
Figure 2B:
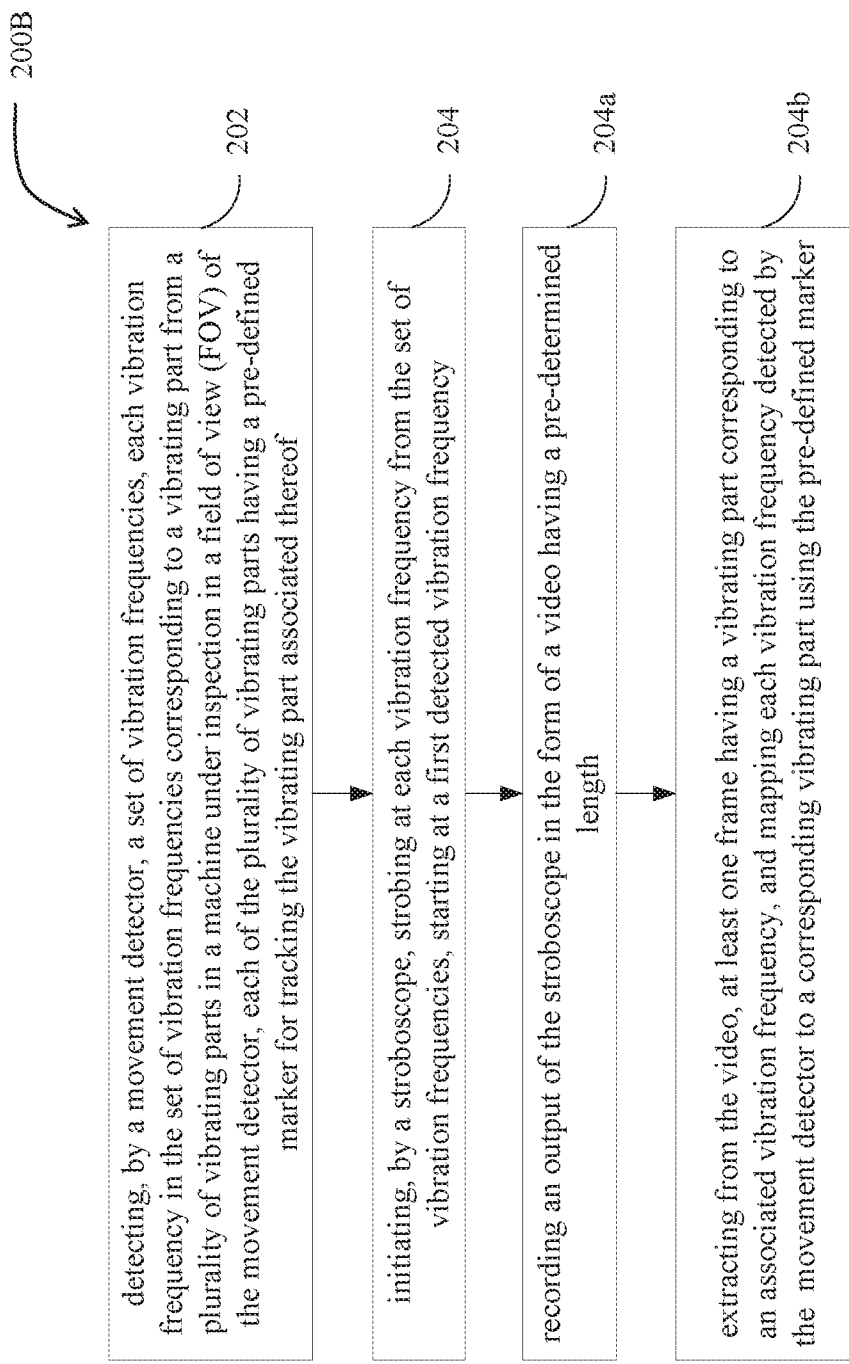
FIG. 2B is an exemplary flow diagram illustrating a computer implemented method for unobtrusive and automated detection of frequencies of spatially located distinct parts of a machine, in accordance with an embodiment of the present disclosure.

FIG. 2A illustrates an exemplary flow chart 200A for a method for unobtrusive and automated detection of frequencies of spatially located distinct parts of a machine and FIG. 2B is an exemplary flow diagram 200B illustrating a computer implemented method for unobtrusive and automated detection of frequencies of spatially located distinct parts of a machine, in accordance with an embodiment of the present disclosure. In an embodiment, the system 100 includes one or more data storage devices or memory 102 operatively coupled to the one or more processors 104 and is configured to store instructions configured for execution of steps of the method 200A or 200B by the one or more processors 104. The steps of the method 200B will now be explained in detail with reference to the components of the system 100 of FIG. 1 and the flow diagram 200A of FIG. 2 with quick reference to some components of a machine inspection apparatus 300 of FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Figure 3:
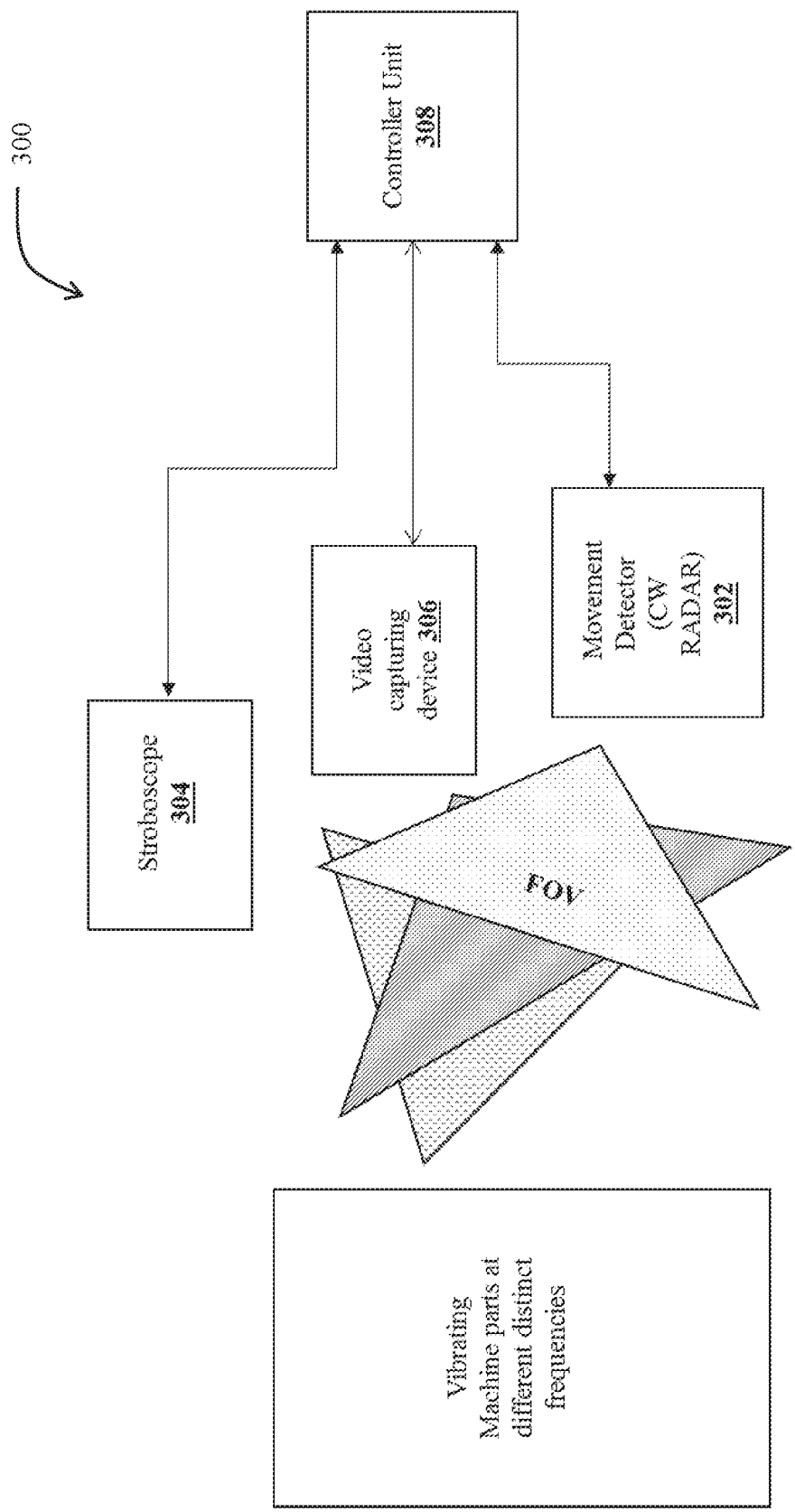
FIG. 3 illustrates a schematic representation of a machine inspection apparatus in accordance with an embodiment of the present disclosure.

In accordance with an embodiment of the present disclosure, the one or more processors 104 are configured to detect by a movement detector (302 of FIG. 3), at step 202, a set of vibration frequencies wherein each vibration frequency in the set corresponds to a vibrating part from a plurality of vibrating parts in a machine under inspection placed in a field of view (FOV) of the movement detector (302 of FIG. 3). In an embodiment, the movement detector is an electromagnetic wave based contactless vibration detector such as RAdio Detection And Ranging (RADAR), SOund Navigation And Ranging (SONAR) and Light Detection And Ranging (LIDAR). In an embodiment, a Continuous Wave RADAR may be employed as the movement detector (302 of FIG. 3). The movement detector (302 of FIG. 3) detects vibration frequencies of all the vibrating parts of the machine under inspection. The detected vibration frequencies may be accurate or approximate vibration frequencies. However, it is not possible to map each vibration frequency with a corresponding vibrating part.

In accordance with an embodiment of the present disclosure, the one or more processors 104 are configured to initiate strobing by a stroboscope (304 of FIG. 3), at step 204, strobing at each vibration frequency from the set of vibration frequencies detected by the movement detector (302 of FIG. 3), starting at a first detected vibration frequency. The plurality of vibration frequencies detected by the movement detector (302 of FIG. 3) helps to reduce the search space of the stroboscope (304 of FIG. 3) thereby reducing convergence time.

In accordance with an embodiment of the present disclosure, the step of strobing (204) at each vibration frequency comprises recording an output of the stroboscope (304 of FIG. 3) by a video capturing device (306 of FIG. 3), at step 204*a*, in the form of a video having a pre-determined length. In an embodiment, the video capturing device (306 of FIG. 3) is an optical camera. The pre-determined length of the video is based on a trade-off between resolution of the detected vibration frequency and measurement time wherein longer the measurement time better is the resolution of the detected vibration frequency. In an embodiment, the pre-determined length of the video is 1 second.

In accordance with the present disclosure, the step of strobing (204) aids in identifying the vibrating part corresponding to each vibration frequency detected by the movement detector (302 of FIG. 3). Each of the plurality of vibrating parts may have a pre-defined marker for tracking the vibrating part. The pre-defined marker may be in the form of an induced mark such as dot or a tick or any other identifiable mark. Alternately, a machine part such as a bolt or a screw head may also serve as the pre-defined marker. In an embodiment, at step 204*b*, at least one frame having a vibrating part corresponding to each of the detected vibration frequency is extracted from the video. The step 204*b* may further comprise visual inspection of the frames comprised in the video wherein one or more frames wherein the pre-defined marker is static or is not blurred may be identified as the one or more frames depicting the vibrating part that maps to the corresponding vibration frequency. Alternately, the system 100 may execute step 204*b* in an automated manner wherein firstly a frequency spectrum of displacement of the pre-defined marker between frames comprised in the video is obtained using Fast Fourier Transform (FFT). A peak frequency is then determined from the obtained frequency spectrum. At least one frame comprised in the video may be extracted and segmented for further analyses. If the determined peak frequency is less than a pre-defined threshold based on a pre-defined precision, the corresponding vibration frequency is identified as the frequency of the vibrating part associated with the pre-defined marker in the segmented at least one frame. The pre-defined precision is defined on the level of precision matching needed between the strobing frequency and the vibration frequency of the vibrating part. In an embodiment, the pre-defined threshold may be 0.5 Hz. Accordingly, if the determined peak frequency is less than say 0.5 Hz, the strobing stops and initiates at a next detected vibration frequency by the movement detector (302 of FIG. 3); else, the stroboscope (304 of FIG. 3) is incrementally tuned at frequencies that are multiples of 0.1 Hz times a pre-determined tuning parameter (a) until the determined peak frequency is less than the pre-defined threshold and the step of extracting and segmenting is repeated. The vibration frequency at which the stroboscope is strobing is mapped to a vibrating part associated with the pre-defined marker identified in the segmented at least one frame. In accordance with the present disclosure, the pre-determined tuning parameter and the pre-defined threshold are based on a trade-of between resolution of the detected vibration frequency and measurement time. Images of all vibrating parts corresponding to each vibration frequency detected by the movement detector (302 of FIG. 3) may then be an input for further processing by say, an automatic fault detection unit.

Figure 4:
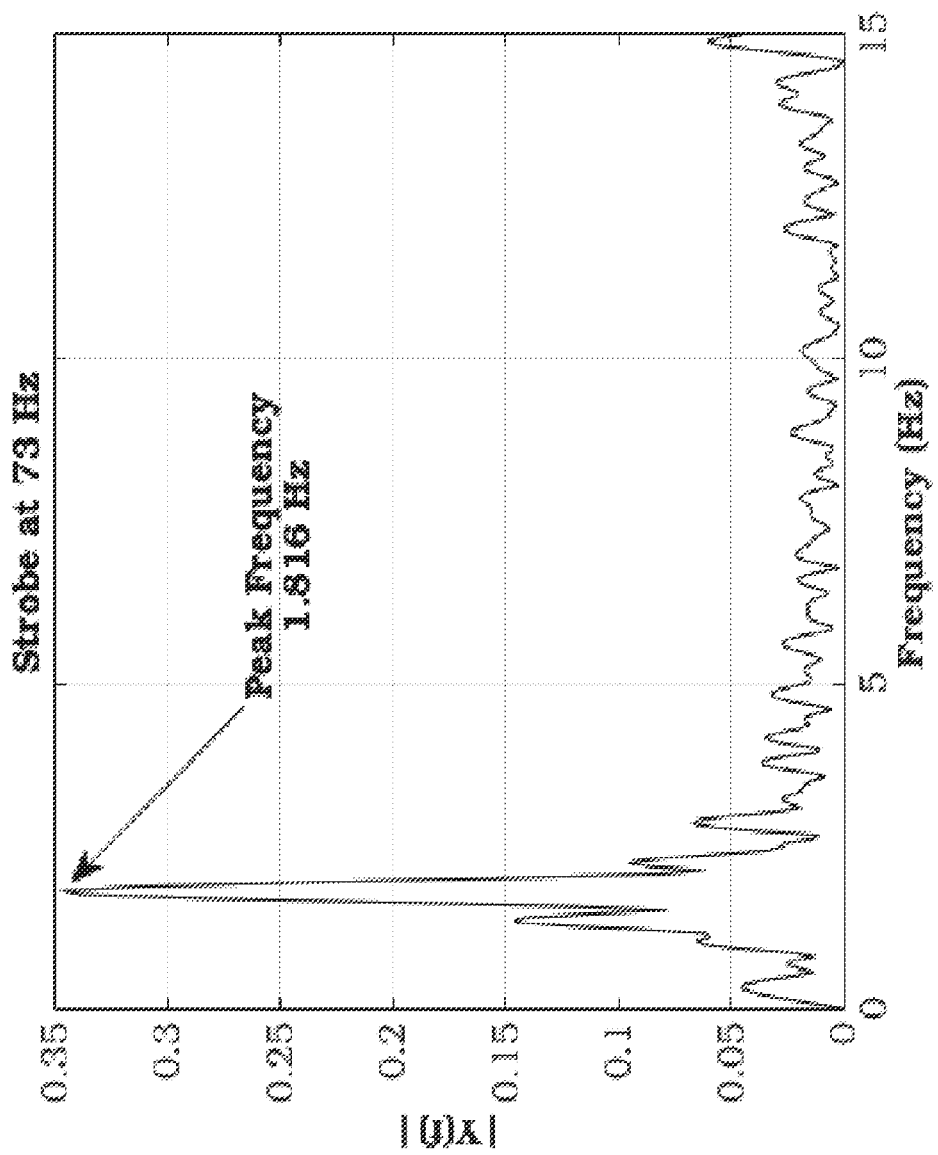
FIG. 4, FIG. 5 and FIG. 6 illustrate exemplary frequency spectrum with identified peak frequency for strobing at 73 Hz, 74 Hz and 75 Hz respectively.
Figure 5:
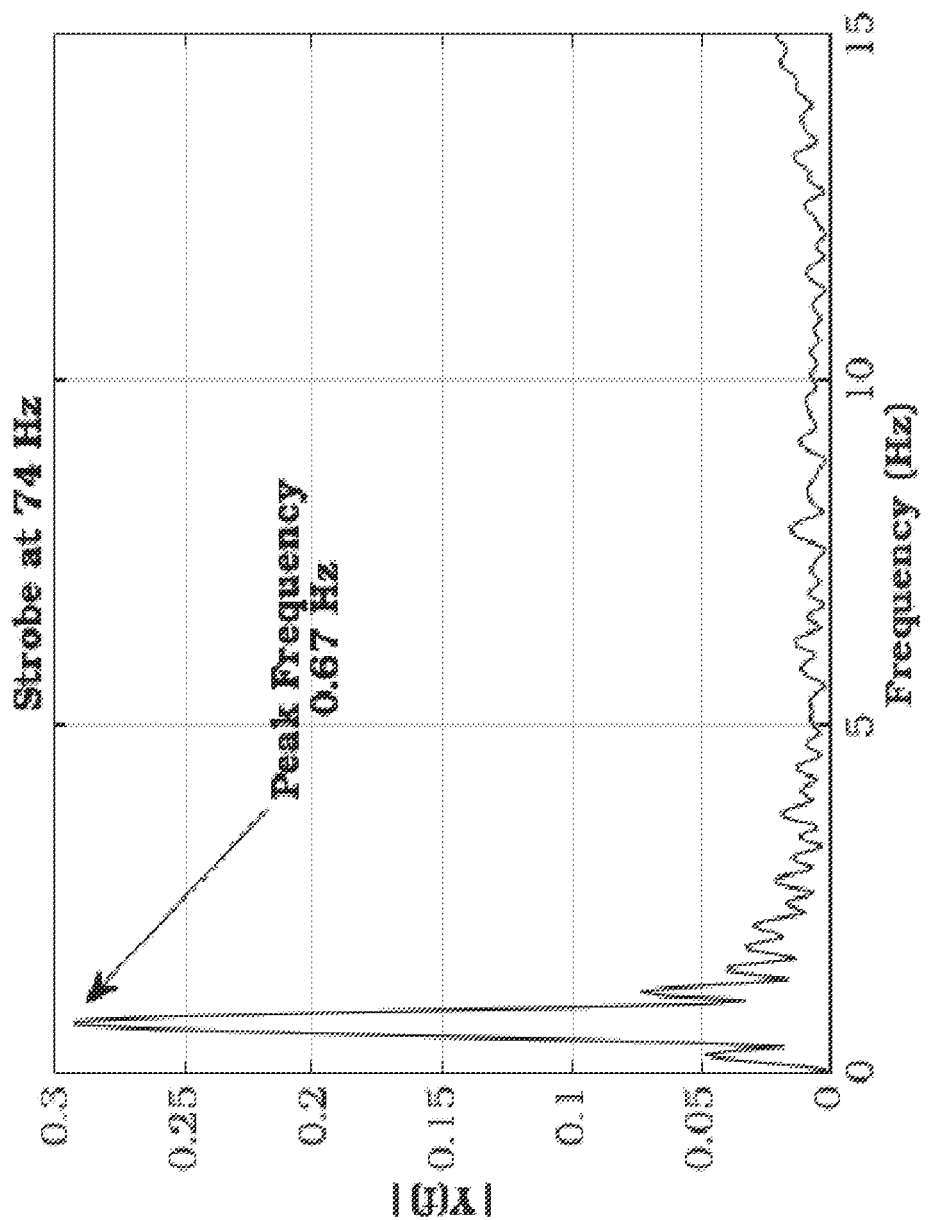
Figure 6:
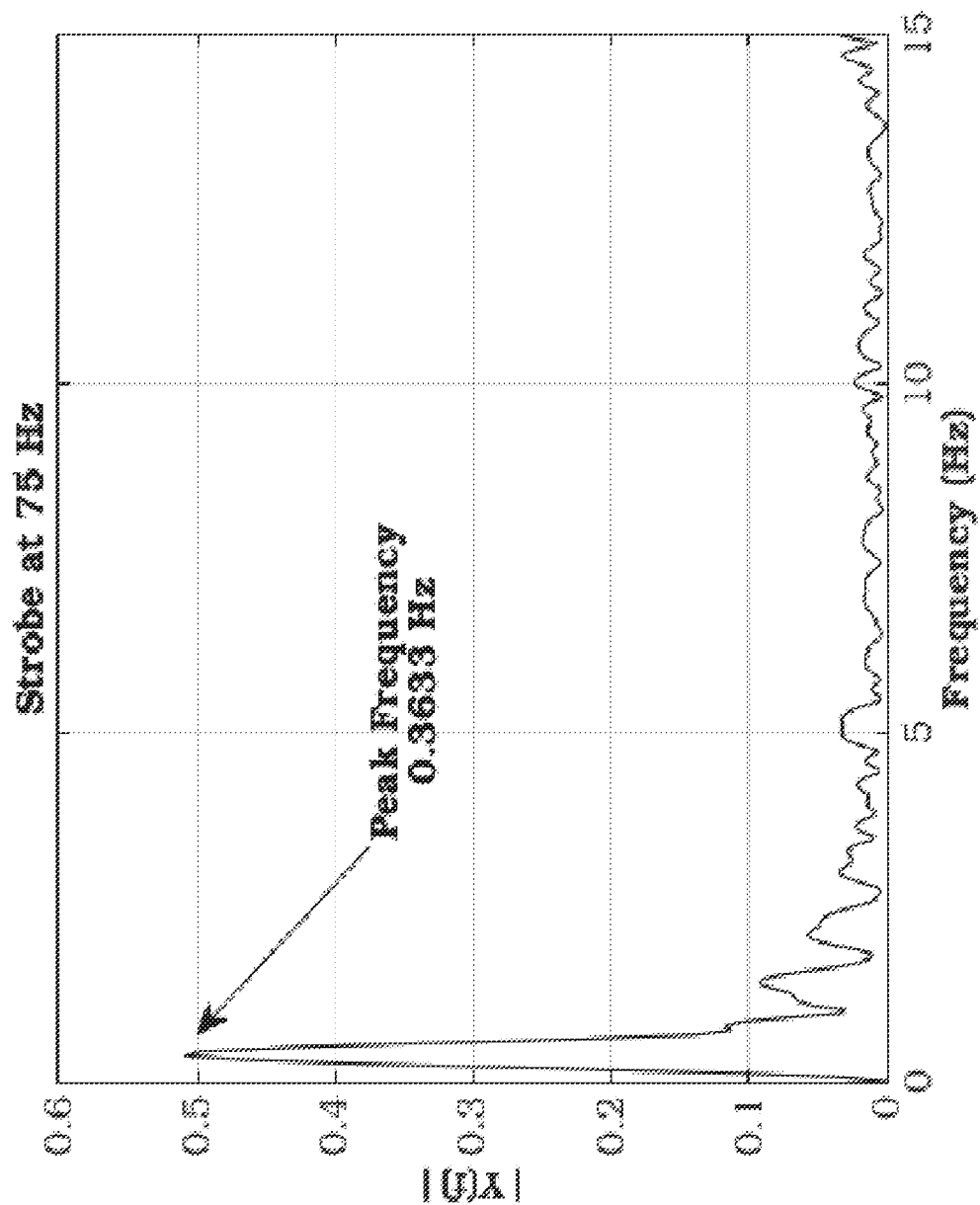

FIG. 4, FIG. 5 and FIG. 6 illustrate exemplary frequency spectrum with identified peak frequency for strobing at 73 Hz, 74 Hz and 75 Hz respectively. In FIG. 4, strobing is performed at 73 Hz and the peak frequency obtained is 1.816 Hz which is greater than the pre-defined threshold, say 0.5 Hz. The stroboscope is tuned and strobing continues at 74 Hz as shown in FIG. 5 wherein the peak frequency obtained is 0.67 Hz which is greater than the pre-defined threshold of 0.5 Hz. The stroboscope is further tuned and strobing continues at 75 Hz as shown in FIG. 6 wherein the peak frequency obtained is 0.3633 Hz which is less than the pre-defined threshold of 0.5 Hz. The frequency of the vibrating part associated with the pre-defined marker that was being tracked may not be considered to be 75 Hz.

FIG. 3 illustrates a schematic representation of a machine inspection apparatus 300 in accordance with an embodiment of the present disclosure. In an embodiment of the present disclosure, the steps of the method 200B may be correlated to the components of the machine inspection apparatus 300 of FIG. 3 wherein the movement detector 302 being an electromagnetic wave based contactless vibration detector selected from the group consisting of RAdio Detection And Ranging (RADAR), SOund Navigation And Ranging (SONAR) and Light Detection And Ranging (LIDAR) may be positioned such that a machine under inspection lies in its field of view (FOV). The movement detector 302 is configured to detect a set of vibration frequencies, each vibration frequency in the set of vibration frequencies corresponding to a vibrating part from a plurality of vibrating parts in the machine under inspection, each of the plurality of vibrating parts having a pre-defined marker for tracking an associated vibrating part associated. In an embodiment, the machine inspection apparatus 300 comprises the stroboscope 304 located proximate the movement detector and configured to initiate strobing at each vibration frequency from the set of vibration frequencies, starting at a first detected vibration frequency. In an embodiment, the machine inspection apparatus 300 comprises the video capturing device 306 configured to record an output of the stroboscope 304 in the form of a video having a pre-determined length. In an embodiment, the machine inspection apparatus 300 further comprises a controller unit 308 in communication with each of the movement detector 302, the stroboscope 304 and the video capturing device 306. In an embodiment, the controller unit 308 comprises one or more data storage devices (not shown) configured to store instructions; and one or more hardware processors (not shown) operatively coupled to the one or more data storage devices, wherein the one or more hardware processors are configured by the instructions to extract from the video, at least one frame having a vibrating part corresponding to an associated vibration frequency, and mapping each vibration frequency detected by the movement detector to a corresponding vibrating part using the pre-defined marker.

In an aspect of the present disclosure, the system 100 described above receives input from external components such as the movement detector, the stroboscope and the video capturing device whereas in the machine inspection apparatus 300, these components constitute the apparatus 300 and the controller unit 308 may perform the functions of the one or more processors 104 of the system 100. Systems and methods of the present disclosure thus provide a simple, unobtrusive and cost effecting solution for real time automated detection of frequencies of spatially located distinct parts of a machine.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method (200) comprising:
   detecting, by a movement detector, a set of vibration frequencies, each vibration frequency in the set of vibration frequencies corresponding to a vibrating part from a plurality of vibrating parts in a machine under inspection in a field of view (FOV) of the movement detector, each of the plurality of vibrating parts having a pre-defined marker for tracking the vibrating part associated thereof (202); and
   initiating, by a stroboscope, strobing at each vibration frequency from the set of vibration frequencies, starting at a first detected vibration frequency (204), the step of strobing at each vibration frequency comprising:
      recording an output of the stroboscope in the form of a video having a pre-determined length (204a); and
      extracting from the video, at least one frame having a vibrating part corresponding to an associated vibration frequency, and mapping each vibration frequency detected by the movement detector to a corresponding vibrating part using the pre-defined marker (204b).

2. The processor implemented method of claim 1, wherein the pre-determined length of the video is 1 second.

3. The processor implemented method of claim 1, wherein the step of extracting from the video, at least one frame having a vibrating part comprises:
obtaining a frequency spectrum of displacement of the pre-defined marker between frames comprised in the video using Fast Fourier Transform (FFT);
determining a peak frequency from the obtained frequency spectrum;
extracting and segmenting at least one frame if the determined peak frequency is less than a pre-defined threshold based on a pre-defined precision; else incrementally tuning the stroboscope to strobe at frequencies that are multiples of 0.1 Hz times a pre-determined tuning parameter until the determined peak frequency is less than the pre-defined threshold and performing the step of extracting and segmenting; and
mapping the vibration frequency at which the stroboscope is strobing to a vibrating part associated with the pre-defined marker identified in the segmented at least one frame.

4. The processor implemented method of claim 1, wherein the moving object detector is an electromagnetic wave based contactless vibration detector selected from the group consisting of RAdio Detection And Ranging (RADAR), and LIght Detection And Ranging (LIDAR).

5. A machine inspection apparatus (300) comprising:
a movement detector (302) being an electromagnetic wave based contactless vibration detector selected from the group consisting of RAdio Detection And Ranging (RADAR), and LIght Detection And Ranging (LIDAR) positioned such that a machine under inspection lies in a field of view (FOV) thereof, the movement detector configured to detect a set of vibration frequencies, each vibration frequency in the set of vibration frequencies corresponding to a vibrating part from a plurality of vibrating parts in the machine under inspection, each of the plurality of vibrating parts having a pre-defined marker for tracking the vibrating part associated thereof;
a stroboscope (304) located proximate the movement detector and configured to initiate strobing at each vibration frequency from the set of vibration frequencies, starting at a first detected vibration frequency;
a video capturing device (306) configured to record an output of the stroboscope (304) in the form of a video having a pre-determined length;
a controller unit (308) in communication with each of the movement detector (302), the stroboscope (304) and the video capturing device (306), wherein the controller unit comprises:
one or more data storage devices configured to store instructions; and
one or more hardware processors operatively coupled to the one or more data storage devices, wherein the one or more hardware processors are configured by the instructions to extract from the video, at least one frame having a vibrating part corresponding to an associated vibration frequency, and map each vibration frequency detected by the movement detector to a corresponding vibrating part using the pre-defined marker.

6. A system (100) comprising:
one or more data storage devices (102) operatively coupled to one or more hardware processors (104) and configured to store instructions configured for execution by the one or more hardware processors to:
receive a set of vibration frequencies, from a movement detector, each vibration frequency in the set of vibration frequencies corresponding to a vibrating part from a plurality of vibrating parts in a machine under inspection in a field of view (FOV) of the movement detector, each of the plurality of vibrating parts having a pre-defined marker for tracking the vibrating part associated thereof;
trigger a stroboscope to initiate strobing at each vibration frequency from the set of vibration frequencies, starting at a first detected vibration frequency, wherein the step of strobing at each vibration frequency comprises:
receiving an output of the stroboscope in the form of a video having a pre-determined length; and
extracting from the video, at least one frame having a vibrating part corresponding to an associated vibration frequency, and mapping each vibration frequency detected by the movement detector to a corresponding vibrating part using the pre-defined marker.

7. The system of claim 6, wherein the pre-determined length of the video is 1 second.

8. The system of claim 6, wherein the one or more hardware processors are further configured to extract from the video, a frame having a vibrating part by:
obtaining a frequency spectrum of displacement of the pre-defined marker between frames comprised in the video using Fast Fourier Transform (FFT);
determining a peak frequency from the obtained frequency spectrum;
extracting and segmenting the at least one frame if the determined peak frequency is less than a pre-defined threshold based on a pre-defined precision; else incrementally tuning the stroboscope to strobe at frequencies that are multiples of 0.1 Hz times a pre-determined tuning parameter until the determined peak frequency is less than the pre-defined threshold and performing the step of extracting and segmenting; and
mapping the vibration frequency at which the stroboscope is strobing to a vibrating part associated with the pre-defined marker identified in the segmented at least one frame.

* * * * *